US012433512B2

(12) United States Patent
Nazzaro et al.

(10) Patent No.: US 12,433,512 B2
(45) Date of Patent: Oct. 7, 2025

(54) ADHESIVE PAD WITH A METALLIC COIL FOR SECURING AN ON-BODY MEDICAL DEVICE

(71) Applicant: Insulet Corporation, Acton, MA (US)

(72) Inventors: David Nazzaro, Groveland, MA (US); John D'Arco, Wilmington, MA (US); Nicholas Conte, Harvard, MA (US); Kepei Sun, Andover, MA (US)

(73) Assignee: INSULET CORPORATION, Acton, MA (US)

( * ) Notice: Subject to any disclaimer, the term of this patent is extended or adjusted under 35 U.S.C. 154(b) by 693 days.

(21) Appl. No.: 17/554,455

(22) Filed: Dec. 17, 2021

(65) Prior Publication Data

US 2022/0192543 A1    Jun. 23, 2022

Related U.S. Application Data

(60) Provisional application No. 63/127,328, filed on Dec. 18, 2020.

(51) Int. Cl.
*A61B 5/145* (2006.01)
*A61B 5/00* (2006.01)
(Continued)

(52) U.S. Cl.
CPC ...... *A61B 5/14532* (2013.01); *A61B 5/14865* (2013.01); *A61B 5/6833* (2013.01);
(Continued)

(58) Field of Classification Search
None
See application file for complete search history.

(56) References Cited

U.S. PATENT DOCUMENTS 441,663 A   12/1890  Hofbauer
955,911 A    4/1910  Saegmuller
(Continued)

FOREIGN PATENT DOCUMENTS

CA   2423717 A    4/2002
CA   2863379 A1   8/2013
(Continued)

OTHER PUBLICATIONS

US 5,954,699 A, 09/1999, Jost et al. (withdrawn)
(Continued)

*Primary Examiner* — Benjamin J Klein
*Assistant Examiner* — Vynn V Huh
(74) *Attorney, Agent, or Firm* — Goodwin Procter LLP

(57) ABSTRACT

Exemplary embodiments may provide an adhesive pad that is designed to be used with an on-body medical device. The adhesive pad may partially or fully surround a perimeter of the on-body medical device. The adhesive pad may be the primary mechanism or may provide an additional mechanism for helping to secure the on-body medical device to the user. In addition, the adhesive pad may include a metallic coil, such as a metal loop, that is woven into the adhesive pad or otherwise inserted into or secured to the adhesive pad. The metallic coil may play multiple roles. First, the metallic coil may act as an antenna to facilitate wireless communications with the on-body medical device, such as NFC communications. In addition, the metallic coil may serve as a power source for electric components positioned on the adhesive pad.

11 Claims, 10 Drawing Sheets

(51) Int. Cl.
*A61B 5/01* (2006.01)
*A61B 5/024* (2006.01)
*A61B 5/11* (2006.01)
*A61B 5/1486* (2006.01)
*A61M 5/142* (2006.01)
*H01Q 1/22* (2006.01)
*H01Q 1/27* (2006.01)
*H01Q 7/00* (2006.01)
*H04B 5/26* (2024.01)
*H04B 5/43* (2024.01)

(52) U.S. Cl.
CPC ............... *A61M 2205/3569* (2013.01); *A61M 2230/201* (2013.01)

(56) References Cited

U.S. PATENT DOCUMENTS

| | | |
|---|---|---|
| 1,177,802 A | 4/1916 | Price |
| 3,631,847 A | 1/1972 | Hobbs |
| 3,812,843 A | 5/1974 | Wootten et al. |
| 3,885,662 A | 5/1975 | Schaefer |
| 3,923,426 A | 12/1975 | Theeuwes |
| 4,067,000 A | 1/1978 | Carlson |
| 4,108,177 A | 8/1978 | Pistor |
| 4,151,845 A | 5/1979 | Clemens |
| 4,193,397 A | 3/1980 | Tucker et al. |
| 4,206,401 A | 6/1980 | Meyer |
| 4,211,998 A | 7/1980 | Junginger et al. |
| 4,231,019 A | 10/1980 | Junginger et al. |
| 4,265,241 A | 5/1981 | Portner et al. |
| 4,268,150 A | 5/1981 | Chen |
| 4,277,226 A | 7/1981 | Archibald |
| 4,307,713 A | 12/1981 | Galkin et al. |
| 4,336,812 A | 6/1982 | Seragnoli |
| 4,342,311 A | 8/1982 | Whitney et al. |
| 4,364,385 A | 12/1982 | Lossef |
| 4,373,527 A | 2/1983 | Fischell |
| 4,398,542 A | 8/1983 | Cunningham et al. |
| 4,424,720 A | 1/1984 | Bucchianeri |
| 4,435,173 A | 3/1984 | Siposs et al. |
| 4,469,481 A | 9/1984 | Kobayashi |
| 4,475,901 A | 10/1984 | Kraegen et al. |
| 4,487,603 A | 12/1984 | Harris |
| 4,498,843 A | 2/1985 | Schneider et al. |
| 4,507,115 A | 3/1985 | Kambara et al. |
| 4,514,732 A | 4/1985 | Hayes, Jr. |
| 4,529,401 A | 7/1985 | Leslie et al. |
| 4,551,134 A | 11/1985 | Slavik et al. |
| 4,559,033 A | 12/1985 | Stephen et al. |
| 4,559,037 A | 12/1985 | Franetzki et al. |
| 4,560,979 A | 12/1985 | Rosskopf |
| 4,562,751 A | 1/1986 | Nason et al. |
| 4,585,439 A | 4/1986 | Michel |
| 4,587,850 A | 5/1986 | Moser |
| 4,598,719 A | 7/1986 | Mattei et al. |
| 4,600,020 A | 7/1986 | Mattei et al. |
| 4,601,707 A | 7/1986 | Albisser et al. |
| 4,624,661 A | 11/1986 | Arimond |
| 4,634,427 A | 1/1987 | Hannula et al. |
| 4,678,408 A | 7/1987 | Nason et al. |
| 4,684,368 A | 8/1987 | Kenyon |
| 4,685,903 A | 8/1987 | Cable et al. |
| 4,734,092 A | 3/1988 | Millerd |
| 4,755,173 A | 7/1988 | Konopka et al. |
| 4,766,889 A | 8/1988 | Trick et al. |
| 4,781,688 A | 11/1988 | Thoma et al. |
| 4,781,693 A | 11/1988 | Martinez et al. |
| 4,791,942 A | 12/1988 | Rickett et al. |
| 4,801,957 A | 1/1989 | Vandemoere |
| 4,808,161 A | 2/1989 | Kamen |
| 4,836,752 A | 6/1989 | Burkett |
| 4,850,954 A | 7/1989 | Charvin |
| 4,855,746 A | 8/1989 | Stacy |
| 4,871,351 A | 10/1989 | Feingold |
| 4,882,600 A | 11/1989 | Van de Moere |
| 4,886,499 A | 12/1989 | Cirelli et al. |
| 4,893,640 A | 1/1990 | Heitmann et al. |
| 4,898,578 A | 2/1990 | Rubalcaba, Jr. |
| 4,898,579 A | 2/1990 | Groshong et al. |
| 4,924,885 A | 5/1990 | Heitmann et al. |
| 4,944,659 A | 7/1990 | Labbe et al. |
| 4,961,055 A | 10/1990 | Habib et al. |
| 4,969,874 A | 11/1990 | Michel et al. |
| 4,973,998 A | 11/1990 | Gates |
| 5,007,458 A | 4/1991 | Marcus et al. |
| 5,045,871 A | 9/1991 | Reinholdson |
| 5,062,841 A | 11/1991 | Siegel |
| 5,109,850 A | 5/1992 | Blanco et al. |
| 5,125,415 A | 6/1992 | Bell |
| 5,176,662 A | 1/1993 | Bartholomew et al. |
| 5,178,609 A | 1/1993 | Ishikawa |
| 5,189,609 A | 2/1993 | Tivig et al. |
| 5,205,819 A | 4/1993 | Ross et al. |
| 5,213,483 A | 5/1993 | Flaherty et al. |
| 5,232,439 A | 8/1993 | Campbell et al. |
| 5,239,326 A | 8/1993 | Takai |
| 5,242,406 A | 9/1993 | Gross et al. |
| 5,244,463 A | 9/1993 | Cordner, Jr. et al. |
| 5,245,447 A | 9/1993 | Stemmle |
| 5,254,096 A | 10/1993 | Rondelet et al. |
| 5,257,980 A | 11/1993 | Van Antwerp et al. |
| 5,281,202 A | 1/1994 | Weber et al. |
| 5,308,335 A | 5/1994 | Ross et al. |
| 5,312,337 A | 5/1994 | Flaherty et al. |
| 5,318,540 A | 6/1994 | Athayde et al. |
| 5,342,313 A | 8/1994 | Campbell et al. |
| 5,346,476 A | 9/1994 | Elson |
| 5,364,342 A | 11/1994 | Beuchat et al. |
| 5,390,671 A | 2/1995 | Lord et al. |
| 5,411,480 A | 5/1995 | Kriesel |
| 5,414,732 A | 5/1995 | Kaufmann |
| 5,433,710 A | 7/1995 | VanAntwerp et al. |
| 5,452,033 A | 9/1995 | Balling et al. |
| 5,492,534 A | 2/1996 | Athayde et al. |
| 5,505,709 A | 4/1996 | Funderburk et al. |
| 5,507,288 A | 4/1996 | Bocker et al. |
| 5,514,096 A | 5/1996 | Hiejima |
| 5,533,389 A | 7/1996 | Kamen et al. |
| 5,545,152 A | 8/1996 | Funderburk et al. |
| 5,551,953 A | 9/1996 | Lattin et al. |
| 5,563,584 A | 10/1996 | Rader et al. |
| 5,569,186 A | 10/1996 | Lord et al. |
| 5,569,187 A | 10/1996 | Kaiser |
| 5,573,342 A | 11/1996 | Patalano et al. |
| 5,575,770 A | 11/1996 | Melsky et al. |
| 5,576,781 A | 11/1996 | Deleeuw |
| 5,582,593 A | 12/1996 | Hultman |
| 5,584,813 A | 12/1996 | Livingston et al. |
| 5,585,733 A | 12/1996 | Paglione |
| 5,586,553 A | 12/1996 | Halili et al. |
| 5,615,693 A | 4/1997 | Saitoh |
| 5,630,710 A | 5/1997 | Tune et al. |
| 5,637,095 A | 6/1997 | Nason et al. |
| 5,643,213 A | 7/1997 | McPhee |
| 5,645,085 A | 7/1997 | Mengoli et al. |
| 5,647,853 A | 7/1997 | Feldmann et al. |
| 5,660,163 A | 8/1997 | Schulman et al. |
| 5,660,728 A | 8/1997 | Saaski et al. |
| 5,665,065 A | 9/1997 | Colman et al. |
| 5,665,070 A | 9/1997 | McPhee |
| 5,678,539 A | 10/1997 | Schubert et al. |
| 5,685,844 A | 11/1997 | Marttila |
| 5,685,859 A | 11/1997 | Kornerup |
| 5,695,490 A | 12/1997 | Flaherty et al. |
| 5,702,363 A | 12/1997 | Flaherty |
| 5,704,520 A | 1/1998 | Gross |
| 5,726,404 A | 3/1998 | Brody |
| 5,726,751 A | 3/1998 | Altendorf et al. |
| 5,740,817 A | 4/1998 | Cunningham |
| 5,741,228 A | 4/1998 | Lambrecht et al. |
| 5,747,350 A | 5/1998 | Sattler |
| 5,748,827 A | 5/1998 | Holl et al. |
| 5,755,682 A | 5/1998 | Knudson et al. |

(56) References Cited

U.S. PATENT DOCUMENTS

| | | |
|---|---|---|
| 5,764,159 A | 6/1998 | Neftel |
| 5,776,103 A | 7/1998 | Kriesel et al. |
| 5,779,676 A | 7/1998 | Kriesel et al. |
| 5,785,681 A | 7/1998 | Indravudh |
| 5,785,688 A | 7/1998 | Joshi et al. |
| 5,797,881 A | 8/1998 | Gadot |
| 5,800,397 A | 9/1998 | Wilson et al. |
| 5,800,405 A | 9/1998 | McPhee |
| 5,800,420 A | 9/1998 | Gross et al. |
| 5,807,375 A | 9/1998 | Gross et al. |
| 5,810,015 A | 9/1998 | Flaherty |
| 5,814,020 A | 9/1998 | Gross |
| 5,830,999 A | 11/1998 | Dunn |
| 5,839,467 A | 11/1998 | Saaski et al. |
| 5,840,063 A | 11/1998 | Flaherty |
| 5,840,630 A | 11/1998 | Cecere et al. |
| 5,845,218 A | 12/1998 | Altschul |
| 5,848,991 A | 12/1998 | Gross et al. |
| 5,851,197 A | 12/1998 | Marano et al. |
| 5,858,005 A | 1/1999 | Kriesel |
| 5,858,239 A | 1/1999 | Kenley et al. |
| 5,865,806 A | 2/1999 | Howell |
| 5,867,688 A | 2/1999 | Simmon et al. |
| 5,871,470 A | 2/1999 | McWha |
| 5,875,393 A | 2/1999 | Altschul et al. |
| 5,886,647 A | 3/1999 | Badger et al. |
| 5,891,097 A | 4/1999 | Saito et al. |
| 5,897,530 A | 4/1999 | Jackson |
| 5,899,882 A | 5/1999 | Waksman et al. |
| 5,906,597 A | 5/1999 | McPhee |
| 5,911,716 A | 6/1999 | Rake et al. |
| 5,919,167 A | 7/1999 | Mulhauser et al. |
| 5,931,814 A | 8/1999 | Alex et al. |
| 5,935,099 A | 8/1999 | Peterson et al. |
| 5,954,058 A | 9/1999 | Flaherty |
| 5,957,890 A | 9/1999 | Mann et al. |
| 5,957,895 A | 9/1999 | Sage et al. |
| 5,961,492 A | 10/1999 | Kriesel et al. |
| 5,965,848 A | 10/1999 | Altschul et al. |
| 5,983,094 A | 11/1999 | Altschul et al. |
| 5,983,136 A | 11/1999 | Kamer |
| 5,984,894 A | 11/1999 | Poulsen et al. |
| 5,993,423 A | 11/1999 | Choi |
| 5,997,501 A | 12/1999 | Gross et al. |
| 6,019,747 A | 2/2000 | McPhee |
| 6,024,539 A | 2/2000 | Blomquist |
| 6,050,457 A | 4/2000 | Arnold et al. |
| 6,061,580 A | 5/2000 | Altschul et al. |
| 6,071,292 A | 6/2000 | Makower et al. |
| 6,144,847 A | 11/2000 | Altschul et al. |
| 6,152,898 A | 11/2000 | Olsen |
| 6,159,188 A | 12/2000 | Laibovitz et al. |
| 6,171,264 B1 | 1/2001 | Bader |
| 6,174,300 B1 | 1/2001 | Kriesel et al. |
| 6,190,359 B1 | 2/2001 | Heruth |
| 6,206,850 B1 | 3/2001 | ONeil |
| 6,244,776 B1 | 6/2001 | Wiley |
| 6,363,609 B1 | 4/2002 | Pickren |
| 6,375,638 B2 | 4/2002 | Nason et al. |
| 6,381,029 B1 | 4/2002 | Tipirneni |
| 6,427,088 B1 | 7/2002 | Bowman, IV et al. |
| 6,485,462 B1 | 11/2002 | Kriesel |
| 6,520,936 B1 | 2/2003 | Mann |
| 6,527,744 B1 | 3/2003 | Kriesel et al. |
| 6,554,798 B1 | 4/2003 | Mann et al. |
| 6,558,320 B1 | 5/2003 | Causey, III et al. |
| 6,572,585 B2 | 6/2003 | Choi |
| 6,641,533 B2 | 11/2003 | Causey, III |
| 6,645,142 B2 | 11/2003 | Braig et al. |
| 6,656,158 B2 | 12/2003 | Mahoney et al. |
| 6,656,159 B2 | 12/2003 | Flaherty |
| 6,669,669 B2 | 12/2003 | Flaherty et al. |
| 6,685,452 B2 | 2/2004 | Christiansen et al. |
| 6,689,091 B2 | 2/2004 | Bui et al. |
| 6,692,457 B2 | 2/2004 | Flaherty |
| 6,723,072 B2 | 4/2004 | Flaherty et al. |
| 6,740,059 B2 | 5/2004 | Flaherty |
| 6,749,587 B2 | 6/2004 | Flaherty |
| 6,768,319 B2 | 7/2004 | Wang |
| 6,768,425 B2 | 7/2004 | Flaherty et al. |
| 6,809,653 B1 | 10/2004 | Mann et al. |
| 6,830,558 B2 | 12/2004 | Flaherty et al. |
| 6,960,192 B1 | 11/2005 | Flaherty et al. |
| 7,018,360 B2 | 3/2006 | Flaherty et al. |
| 7,029,455 B2 | 4/2006 | Flaherty |
| 7,083,593 B2 | 8/2006 | Stultz |
| 7,128,727 B2 | 10/2006 | Flaherty et al. |
| 7,137,964 B2 | 11/2006 | Flaherty |
| 7,144,384 B2 | 12/2006 | Gorman et al. |
| 7,182,726 B2 | 2/2007 | Williams et al. |
| 7,303,073 B2 | 12/2007 | Raynal-Olive et al. |
| 7,887,505 B2 | 2/2011 | Flaherty |
| 7,887,511 B2 | 2/2011 | Mernoe et al. |
| 8,056,719 B2 | 11/2011 | Porret et al. |
| 8,105,282 B2 | 1/2012 | Susi et al. |
| 8,140,275 B2 | 3/2012 | Campbell et al. |
| 8,285,487 B2 | 10/2012 | Bergstrom et al. |
| 8,454,557 B1 | 6/2013 | Qi et al. |
| 8,461,561 B2 | 6/2013 | Freeman et al. |
| 8,622,954 B2 | 1/2014 | Shahmirian et al. |
| 8,663,103 B2 | 3/2014 | Causey et al. |
| 8,727,117 B2 | 5/2014 | Maasarani |
| 9,005,166 B2 | 4/2015 | Uber, III et al. |
| 9,248,229 B2 | 2/2016 | Devouassoux et al. |
| 9,427,710 B2 | 8/2016 | Jansen |
| 9,598,195 B2 | 3/2017 | Deutschle et al. |
| 9,813,985 B2 | 11/2017 | Shapley et al. |
| 9,862,519 B2 | 1/2018 | Deutschle et al. |
| 10,046,114 B1 | 8/2018 | Biederman et al. |
| 10,064,992 B2 | 9/2018 | Yang |
| 10,086,131 B2 | 10/2018 | Okihara |
| 10,342,926 B2 | 7/2019 | Nazzaro et al. |
| 10,441,717 B2 | 10/2019 | Schmid et al. |
| 10,448,885 B2 | 10/2019 | Schmid |
| 2001/0056258 A1 | 12/2001 | Evans |
| 2002/0016568 A1 | 2/2002 | Lebel et al. |
| 2002/0019606 A1 | 2/2002 | Lebel et al. |
| 2002/0032374 A1 | 3/2002 | Holker et al. |
| 2002/0040208 A1 | 4/2002 | Flaherty et al. |
| 2002/0065454 A1 | 5/2002 | Lebel et al. |
| 2002/0107476 A1 | 8/2002 | Mann et al. |
| 2002/0123740 A1 | 9/2002 | Flaherty et al. |
| 2002/0126036 A1 | 9/2002 | Flaherty et al. |
| 2002/0161307 A1 | 10/2002 | Yu et al. |
| 2002/0169416 A1 | 11/2002 | Gonnelli et al. |
| 2003/0055406 A1 | 3/2003 | Lebel et al. |
| 2003/0065308 A1 | 4/2003 | Ebel et al. |
| 2003/0073952 A1 | 4/2003 | Flaherty et al. |
| 2003/0088238 A1 | 5/2003 | Poulsen et al. |
| 2003/0212379 A1 | 11/2003 | Bylund et al. |
| 2003/0217755 A1 | 11/2003 | Koch et al. |
| 2004/0010207 A1 | 1/2004 | Flaherty et al. |
| 2004/0010507 A1 | 1/2004 | Bellew |
| 2004/0068224 A1 | 4/2004 | Couvillon, Jr. et al. |
| 2004/0085215 A1 | 5/2004 | Moberg et al. |
| 2004/0092865 A1 | 5/2004 | Flaherty et al. |
| 2004/0122489 A1 | 6/2004 | Mazar et al. |
| 2004/0215492 A1 | 10/2004 | Choi |
| 2004/0260233 A1 | 12/2004 | Garibotto et al. |
| 2005/0055242 A1 | 3/2005 | Bello et al. |
| 2005/0171512 A1 | 8/2005 | Flaherty |
| 2005/0238507 A1 | 10/2005 | Dilanni et al. |
| 2006/0086909 A1 | 4/2006 | Schaber |
| 2006/0092569 A1 | 5/2006 | Che et al. |
| 2006/0264926 A1 | 11/2006 | Kochamba |
| 2006/0282290 A1 | 12/2006 | Flaherty et al. |
| 2006/0292987 A1 | 12/2006 | Ophir et al. |
| 2007/0027370 A1 | 2/2007 | Brauker et al. |
| 2007/0078784 A1 | 4/2007 | Donovan et al. |
| 2007/0112298 A1 | 5/2007 | Mueller et al. |
| 2007/0118405 A1 | 5/2007 | Campbell et al. |
| 2007/0179885 A1 | 8/2007 | Bird et al. |
| 2007/0191770 A1 | 8/2007 | Moberg et al. |
| 2007/0233051 A1 | 10/2007 | Hohl et al. |

(56) References Cited

U.S. PATENT DOCUMENTS

| | | |
|---|---|---|
| 2007/0281617 A1 | 12/2007 | Meylan et al. |
| 2008/0004515 A1 | 1/2008 | Jennewine |
| 2008/0027371 A1 | 1/2008 | Higuchi et al. |
| 2008/0033272 A1 | 2/2008 | Gough et al. |
| 2008/0077081 A1 | 3/2008 | Mounce et al. |
| 2008/0173073 A1 | 7/2008 | Downie et al. |
| 2008/0255438 A1 | 10/2008 | Saidara et al. |
| 2008/0269723 A1 | 10/2008 | Mastrototaro et al. |
| 2008/0281290 A1 | 11/2008 | Yodfat et al. |
| 2009/0048556 A1 | 2/2009 | Durand |
| 2009/0062767 A1 | 3/2009 | Van Antwerp et al. |
| 2009/0069787 A1 | 3/2009 | Estes et al. |
| 2009/0076359 A1 | 3/2009 | Peyser |
| 2009/0112769 A1 | 4/2009 | Dicks et al. |
| 2009/0177142 A1 | 7/2009 | Blomquist et al. |
| 2009/0254041 A1 | 10/2009 | Krag et al. |
| 2010/0076275 A1 | 3/2010 | Chu et al. |
| 2010/0094251 A1 | 4/2010 | Estes |
| 2010/0114026 A1 | 5/2010 | Karratt et al. |
| 2010/0137784 A1 | 6/2010 | Cefai et al. |
| 2010/0145272 A1 | 6/2010 | Cefai et al. |
| 2010/0185175 A1 | 7/2010 | Kamen et al. |
| 2010/0286997 A1 | 11/2010 | Srinivasan |
| 2010/0305661 A1 * | 12/2010 | Crouther ............ A61M 5/1723 604/93.01 |
| 2011/0009824 A1 | 1/2011 | Yodfat et al. |
| 2011/0047499 A1 | 2/2011 | Mandro et al. |
| 2011/0071765 A1 | 3/2011 | Yodfat et al. |
| 2011/0093286 A1 | 4/2011 | Dicks et al. |
| 2011/0118578 A1 | 5/2011 | Timmerman |
| 2011/0118694 A1 | 5/2011 | Yodfat et al. |
| 2011/0124996 A1 | 5/2011 | Reinke et al. |
| 2011/0142688 A1 | 6/2011 | Chappel et al. |
| 2011/0152658 A1 | 6/2011 | Peyser et al. |
| 2011/0213306 A1 | 9/2011 | Hanson et al. |
| 2011/0218495 A1 | 9/2011 | Remebe |
| 2011/0225024 A1 | 9/2011 | Seyer et al. |
| 2011/0246235 A1 | 10/2011 | Powell et al. |
| 2011/0257496 A1 | 10/2011 | Terashima et al. |
| 2011/0313680 A1 | 12/2011 | Doyle, III |
| 2011/0316562 A1 | 12/2011 | Cefai et al. |
| 2012/0029941 A1 | 2/2012 | Malave et al. |
| 2012/0050046 A1 | 3/2012 | Satorius et al. |
| 2012/0054841 A1 | 3/2012 | Schultz et al. |
| 2012/0153936 A1 | 6/2012 | Romani et al. |
| 2012/0182939 A1 | 7/2012 | Rajan et al. |
| 2012/0184909 A1 | 7/2012 | Gyrn |
| 2012/0203085 A1 | 8/2012 | Rebec |
| 2012/0232520 A1 | 9/2012 | Sloan et al. |
| 2012/0265166 A1 | 10/2012 | Yodfat |
| 2012/0266251 A1 | 10/2012 | Birthwhistle et al. |
| 2012/0277667 A1 | 11/2012 | Yodat et al. |
| 2013/0030841 A1 | 1/2013 | Bergstrom et al. |
| 2013/0036100 A1 | 2/2013 | Nagpal et al. |
| 2013/0060194 A1 | 3/2013 | Rostein |
| 2013/0080832 A1 | 3/2013 | Dean et al. |
| 2013/0138452 A1 | 5/2013 | Cork et al. |
| 2013/0173473 A1 | 7/2013 | Birtwhistle et al. |
| 2013/0245545 A1 | 9/2013 | Arnold et al. |
| 2013/0274576 A1 | 10/2013 | Amirouche et al. |
| 2014/0039383 A1 | 2/2014 | Dobbles et al. |
| 2014/0114277 A1 | 4/2014 | Eggert et al. |
| 2014/0148779 A1 | 5/2014 | Rao et al. |
| 2014/0163664 A1 | 6/2014 | Goldsmith |
| 2014/0180203 A1 | 6/2014 | Budiman et al. |
| 2014/0309615 A1 | 10/2014 | Mazlish |
| 2015/0038898 A1 | 2/2015 | Palmer et al. |
| 2015/0057634 A1 | 2/2015 | Mastrototaro et al. |
| 2015/0057807 A1 | 2/2015 | Mastrototaro et al. |
| 2015/0057913 A1 | 2/2015 | Benhammou |
| 2015/0119666 A1 | 4/2015 | Brister et al. |
| 2015/0164390 A1 | 6/2015 | Larvenz et al. |
| 2015/0173674 A1 | 6/2015 | Hayes et al. |
| 2015/0217052 A1 | 8/2015 | Keenan et al. |
| 2015/0290391 A1 | 10/2015 | Schmid et al. |
| 2015/0366945 A1 | 12/2015 | Greene |
| 2016/0022905 A1 | 1/2016 | Nagar et al. |
| 2016/0183794 A1 | 6/2016 | Gannon et al. |
| 2016/0184517 A1 | 6/2016 | Baek et al. |
| 2016/0339172 A1 | 11/2016 | Michaud et al. |
| 2017/0100536 A1 | 4/2017 | Estes |
| 2017/0112531 A1 | 4/2017 | Schoonmaker et al. |
| 2017/0117622 A1 | 4/2017 | Backman et al. |
| 2017/0173261 A1 | 6/2017 | O'Connor et al. |
| 2018/0008770 A1 | 1/2018 | Savoie et al. |
| 2018/0040255 A1 | 2/2018 | Freeman et al. |
| 2018/0075200 A1 | 3/2018 | Davis et al. |
| 2018/0280609 A1 | 10/2018 | Nishimura et al. |
| 2018/0296757 A1 | 10/2018 | Finan et al. |
| 2018/0307515 A1 | 10/2018 | Meller et al. |
| 2019/0117133 A1 | 4/2019 | Halac et al. |
| 2019/0132801 A1 | 5/2019 | Kamath et al. |
| 2019/0150805 A1 | 5/2019 | Routh et al. |
| 2019/0321545 A1 | 10/2019 | Saint |
| 2020/0037939 A1 | 2/2020 | Castagna et al. |
| 2020/0147304 A1 | 5/2020 | Crouther et al. |

FOREIGN PATENT DOCUMENTS

| | | |
|---|---|---|
| CN | 1476566 A | 2/2004 |
| CN | 201134101 Y | 10/2008 |
| DE | 4200595 C2 | 7/1993 |
| DE | 19920896 A1 | 11/2000 |
| EP | 0319272 A2 | 6/1989 |
| EP | 0342947 A2 | 11/1989 |
| EP | 0755636 A1 | 1/1997 |
| EP | 0763369 A1 | 3/1997 |
| EP | 0867196 A2 | 9/1998 |
| EP | 0937475 A2 | 8/1999 |
| EP | 1177802 A1 | 2/2002 |
| EP | 1762263 A1 | 3/2007 |
| EP | 1839694 A1 | 10/2007 |
| EP | 1852703 A1 | 11/2007 |
| EP | 2099384 A1 | 9/2009 |
| EP | 2353628 A2 | 8/2011 |
| EP | 1874390 B1 | 10/2014 |
| EP | 3068290 A1 | 9/2016 |
| EP | 3187201 A1 | 7/2017 |
| EP | 3598942 A1 | 1/2020 |
| EP | 3607985 A1 | 2/2020 |
| ES | 2559866 T3 | 2/2016 |
| GB | 1401588 A | 7/1975 |
| GB | 2176595 A | 12/1986 |
| GB | 2443260 A | 4/2008 |
| GB | 2443261 A | 4/2008 |
| GB | 2461086 A | 12/2009 |
| GB | 2495014 A | 3/2013 |
| GB | 2524717 A | 10/2015 |
| GB | 2525149 A | 10/2015 |
| JP | 2001190659 A | 7/2001 |
| JP | 2003154190 A | 5/2003 |
| JP | 2007144141 A1 | 6/2007 |
| JP | 2007307359 A | 11/2007 |
| JP | 2008242502 A | 10/2008 |
| JP | 2012210441 A | 11/2012 |
| WO | 8101658 A1 | 6/1981 |
| WO | 8606796 A1 | 11/1986 |
| WO | 9800193 A1 | 1/1998 |
| WO | 9801071 A1 | 1/1998 |
| WO | 9819145 A1 | 5/1998 |
| WO | 9824495 A1 | 6/1998 |
| WO | 9841267 A1 | 9/1998 |
| WO | 9910040 A1 | 3/1999 |
| WO | 9910049 A1 | 3/1999 |
| WO | 9956803 A1 | 11/1999 |
| WO | 9962576 A1 | 12/1999 |
| WO | 0010628 A2 | 3/2000 |
| WO | 0013580 A1 | 3/2000 |
| WO | 0019887 A1 | 4/2000 |
| WO | 0029047 A1 | 5/2000 |
| WO | 0029049 A1 | 5/2000 |
| WO | 0030705 A1 | 6/2000 |
| WO | 0048112 A2 | 8/2000 |
| WO | 0061215 A1 | 10/2000 |

(56) References Cited

FOREIGN PATENT DOCUMENTS

| | | |
|---|---|---|
| WO | 0074752 A1 | 12/2000 |
| WO | 0078210 A1 | 12/2000 |
| WO | 0152727 A1 | 7/2001 |
| WO | 0015663 A1 | 8/2001 |
| WO | 0156633 A1 | 8/2001 |
| WO | 0176684 A1 | 10/2001 |
| WO | 0220073 A2 | 3/2002 |
| WO | 0226282 A2 | 4/2002 |
| WO | 2003090509 | 11/2003 |
| WO | 2005031631 A2 | 4/2005 |
| WO | 2006060668 A2 | 6/2006 |
| WO | 2007112034 A2 | 10/2007 |
| WO | 2008024814 A2 | 2/2008 |
| WO | 2009023634 A2 | 2/2009 |
| WO | 2009032399 A1 | 3/2009 |
| WO | 2010025433 A1 | 3/2010 |
| WO | 2010078434 A2 | 7/2010 |
| WO | 2010146579 A1 | 12/2010 |
| WO | 2011012465 A1 | 2/2011 |
| WO | 2011133823 A1 | 10/2011 |
| WO | 2013149186 A1 | 10/2013 |
| WO | 2014136105 A1 | 9/2014 |
| WO | 2015187793 A1 | 12/2015 |
| WO | 2016041873 A1 | 3/2016 |
| WO | 2016181384 A2 | 11/2016 |
| WO | 2017089289 A1 | 6/2017 |
| WO | 2017205816 A1 | 11/2017 |
| WO | 2019043702 A1 | 3/2019 |
| WO | 2019094440 A1 | 5/2019 |
| WO | 2020124058 A1 | 6/2020 |

OTHER PUBLICATIONS

International Preliminary Examination Report issued in PCT Application No. PCT/US01/31089, issued Jan. 7, 2004, 4 pages.
International Preliminary Examination Report issued in PCT Application No. PCT/US03/28769, received Aug. 16, 2004, 3 pages.
International Preliminary Examination Report for International Patent Application No. PCT/US03/29019, received Nov. 5, 2004, 3 pages.
International Preliminary Examination Report for International Patent Application No. PCT/US02/30803, received Sep. 3, 2004, 3 pages.
International Preliminary Examination Report for International Patent Application No. PCT/US03/19756, received Apr. 20, 2005, 3 pages.
International Preliminary Examination Report for International Patent Application No. PCT/US03/09952, received Jan. 22, 2004, 3 pages.
Web-Site Brochure dated Jan. 4, 2000. MiniMed 508. "Doing its job. Naturally." www.minimed.com/tiles/mm_113.htm.
Web-site Brochure dated Dec. 20, 1999. Applied Medical Technology. "508 Pump Information". Www.applied-medical.co.uk/508.htm.
Web-Site Brochure dated Jan. 4, 2000. "The Glucose Sensor". Www.animascorp.com/sensor_f.html.
Web-Site Brochure dated Dec. 20, 1999. "The Animas R-1000 Insulin Pump". Www.animascorp.com/pump_f_s.html.
Web-Site Brochure dated Dec. 20, 1999. "The Animas R-1000 Insulin Pump". Www.animascorp.com/pump_f_f.html.
Web-site Brochure dated Jan. 4, 2000. SOOIL-Homepage. "Portable Insulin Pump". Www.sooil.com/intro2.htm.
Web-Site Brochure dated Jan. 4, 2000. SOOIL-Homepage. "Portable Insulin Pump". Www.sooil.com/product2.htm.
Web-Site Brochure dated Jan. 4, 2000. SOOIL-Homepage. "Portable Insulin Pump". Www.sooil.com/product3.htm.
Web-Site Brochure dated Jan. 4, 2000. SOOIL-Homepage. "Portable Insulin Pump". Www.sooil.com/product4.htm.
User's Guide for Model 508 Insulin Pump, MiniMed, Aug. 2000, 145 pages.
International Search Report for International Patent Application No. PCT/US03/12370, mailed Dec. 15, 2003, 1 page.
International Preliminary Examination Report for International Patent Application No. PCT/US03/12370, received Feb. 2, 2007, 4 pages.
International Preliminary Examination Report for International Patent Application No. PCT/US03/16545, received Mar. 22, 2004, 3 pages.
International Search Report for International Patent Application No. PCT/US02/30803, mailed Mar. 3, 2003, 1 page.
International Search Report for International Patent Application No. PCT/US03/09952, mailed Aug. 12, 2003, 1 page.
International Search Report for International Patent Application No. PCT/US03/16545, mailed Oct. 6, 2003, 1 page.
International Search Report for International Patent Application No. PCT/US03/19756, mailed Mar. 10, 2004, 1 page.
International Preliminary Examination Report for International Patent Application No. PCT/US03/16640, mailed Mar. 15, 2004, 3 pages.
International Preliminary Examination Report for International Patent Application No. PCT/US01/51285, received May 30, 2005, 3 pages.
International Search Report for International Patent Application No. PCT/US03/16640, mailed Oct. 2, 2003.
International Search Report for International Patent Application No. PCT/US03/09606, mailed Oct. 20, 2003, 1 page.
International Search Report for International Patent Application No. PCT/US01/10933, mailed Aug. 21, 2001, 1 page.
International Preliminary Examination Report for International Patent Application No. PCT/US01/27108, received Nov. 6, 2003, 3 pages.
International Search Report for International Patent Application No. PCT/US02/05338, mailed Dec. 18, 2002, 2 pages.
International Preliminary Examination Report for International Patent Application No. PCT/US01/10933, received Oct. 30, 2003, 6 pages.
International Search Report for International Patent Application No. PCT/US01/27108, mailed Apr. 3, 2002, 3 pages.
International Preliminary Examination Report issued in PCT Application No. PCT/US02/05338 received Apr. 8, 2003, 2 pages.
International Preliminary Examination Report issued in PCT Application No. PCT/US03/03731 received Mar. 29, 2005, 4 pages.
International Preliminary Examination Report issued in PCT Application No. PCT/US03/09606, received Jan. 22, 2004, 3 pages.
International Preliminary Examination Report issued in PCT Application No. PCT/US02/28053, received Dec. 13, 2004, 3 pages.
International Search Report for International Application No. PCT/US02/28053, mailed May 20, 2003, 1 page.
International Search Report for International Application No. PCT/US03/03731, mailed Jul. 2, 2003, 2 pages.
International Search Report for International Application No. PCT/US01/31089, dated May 16, 2002, 3 pages.
International Search Report for International Patent Application No. PCT/US01/50581, dated Sep. 30, 2002, 3 pages.
International Search Report for International Patent Application No. PCT/US01/51285, mailed Nov. 11, 2002.
International Search Report for International Patent Application No. PCT/US03/29019, mailed Aug. 2, 2004, 1 page.
International Search Report and Written Opinion for International Application No. PCT/US16/63420; mailed Mar. 29, 2017, 13 pages.
International Search Report and Writen Opinion for PCT Application No. PCT/GB2015/050249, mailed Jul. 7, 2015, 18 pages.
International Search Report and Written Opinion for PCT Application No. PCT/US16/37189, mailed Sep. 9, 2016, 17 pages.
International Search Report and Writen Opinion for PCT Application No. PCT/US04/13804, mailed Nov. 16, 2004, 4 pages.
Preliminary Report on Patentability mailed Dec. 12, 2017, issued in PCT International Patent Application No. PCT/US2016/037189, 11 pages.
International Search Report and Written Opinion for the International Patent Application No. PCT/US21/064056, mailed Apr. 4, 2022, 12 pages.

(56) References Cited

OTHER PUBLICATIONS

Anonymous: "AndroidAPS ComponentOverview", AndroidAPS documentation, Nov. 12, 2020 (Nov. 12, 2020), pp. 1-7, Retrieved from the Internet: URL:https://github.com/openaps/AndroidAPSdocs/blob/199ef86a900adf4b3d9c32f605eb11047bd3d62f/docs/EN/Module/module.rst [retrieved on Apr. 11, 2022] the whole document.
International Search Report and Written Opinion for the International Patent Application No. PCT/US2021/063914, mailed Apr. 13, 2022, 11 pages.
International Search Report and Written Opinion for International Patent Application No. PCT/US2022/029012, mailed Aug. 19, 2022, 12 pages.
International Search Report and Written Opinion for the International Patent Application No. PCT/US2021/047690, mailed Jan. 14, 2022, 13 pages.
International Search Report and Written Opinion for the International Patent Application No. PCT/US2022/055745, mailed Feb. 14, 2022, 13 pages.
International Search Report and Written Opinion for the International Patent Application No. PCT/US2021/053162, mailed Mar. 28, 2022, 18 pages.
International Search Report and Written Opinion for the International Patent Application No. PCT/US2021/064041, mailed Apr. 29, 2022, 11 pages.
International Search Report and Written Opinion for the International Patent Application No. PCT/US2022/015809, mailed Jun. 20, 2022, 15 pages.
International Search Report for International Patent Application No. PCT/US03/28769, mailed Jun. 23, 2004, 1 page.
International Search Report and Written Opinion for the International Patent Application No. PCT/US2022/013139, mailed May 18, 2022, 12 pages.
International Search Report and Written Opinion for the International Patent Application No. PCT/US2021/063918, mailed May 30, 2022, 10 pages.
Communication Pursuant to Article 96(2) EPC EPA No. 01968320.0 (Jan. 21, 2005).
Communication Pursuant To Article 96(2) EPC EPA No. 01987579.8 (Jan. 26, 2005).
Communication Pursuant to Article 96(2) EPC EPA No. 01977472.8 (Jul. 19, 2004).
European Search Report for the European Patent Application No. EP03743667, dated Jul. 22, 2008.
International Search Report and Written Opinion mailed Sep. 9, 2016, issued in PCT Patent Application No. PCT/US2016/037189, 12 pages.
Preliminary Report on Patentability mailed Dec. 21, 2017, issued in PCT Patent Application No. PCT/US2016/037189.
U.K. Intellectual Property Office, GB Application No. GB 1401587.9, "Search Report under Section 17(5)" Aug. 11, 2015, 1 page.
International Search Report and Written Opinion for PCT Application No. PCT/GB2015/050247, May 8, 2015, 14 pages.
Extended Search Report mailed Nov. 24, 2017, issued in European Patent Application No. 15779465.2, 10 pages.
International Search Report and Written Opinion for PCT Application No. PCT/US15/26875, mailed Jan. 18, 2016, 10 pages.
U.K. Intellectual Property Office, GB Application No. GB 1401588.7, "Search Report under Section 17(5)" Aug. 17, 2015, 1 page.
U.K. Intellectual Property Office, GB Application No. GB 1401589.5, "Search Report under Section 17" Jul. 27, 2015, 1 page.
International Search Report and Written Opinion for PCT Application No. PCT/GB2015/050250, May 7, 2015, 9 pages.
3GPP TS 23.003 V10.0.0.0 Numbering, addressing and identification. Dec. 2010.
International Search Report and Written Opinion for PCT Application No. PCT/GB2015/050251, Jun. 12, 2015, 9 pages.
European Search Report for the European Patent Application No. EP19194241, dated Oct. 22, 2019, 6 pages.
International Preliminary Report on Patentability for PCT/US2017/061095, issued on May 14, 2019, 6 pages.
International Search Report and Written Opinion for PCT/US18/52468, mailed on Feb. 26, 2019, 16 pages.
International Search Report and Written Opinion for PCT/US2017/061095, mailed on Feb. 20, 2018, 8 pages.

* cited by examiner

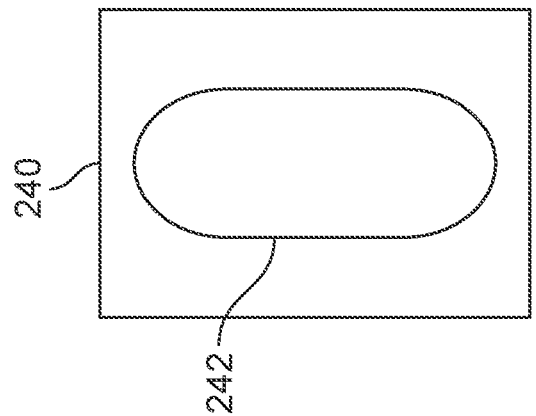
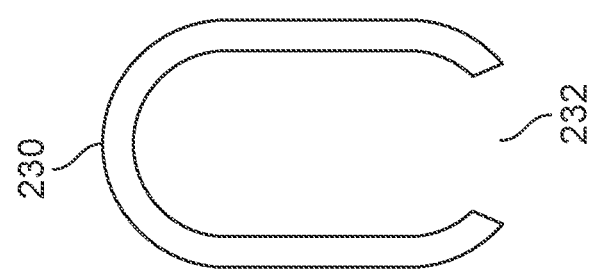
FIG. 2B
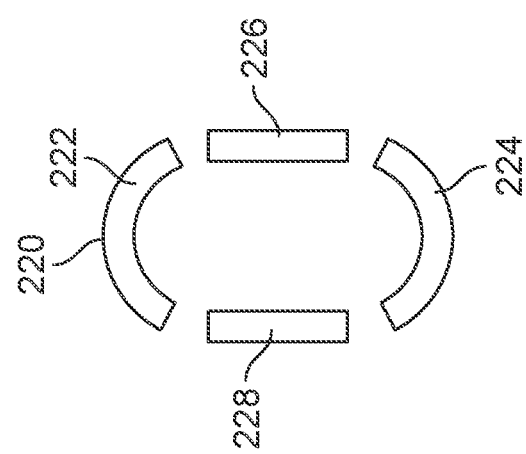

ADHESIVE PAD WITH A METALLIC COIL FOR SECURING AN ON-BODY MEDICAL DEVICE

RELATED APPLICATIONS

This application claims the benefit of U.S. Provisional Patent Application No. 63/127,328, filed Dec. 18, 2020, the contents of which are incorporated herein by reference in their entirety.

BACKGROUND

On-body medical devices need to be secured to a user. One way to secure to an on-body medical device is to provide an adhesive. The adhesive may be applied directly to a bottom surface of the on-body drug delivery device and then adhered to skin of the user. Alternatively, an adhesive pad may be secured to the on-body medical device and an adhesive-covered side of the adhesive pad may be stuck to skin of the user.

On-body medical devices have little room for additional electronic components. Typically, electronic components are situated on a printed circuit board that has no free space for additional components. There is a general desire to keep on-body medical devices small in size so as to be less cumbersome to a user and to be more readily situated out of sight, such as by being situated under clothing or in areas of the body like the back of the arm that are not usually as visible to an observer.

SUMMARY

In accordance with an inventive aspect, an adhesive pad is for use with an on-body medical device. The adhesive pad has a geometry configured to at least partially surround the on-body medical device. The adhesive pad includes an adhesive on at least one side of the adhesive pad for securing the adhesive pad to skin of a user. The novel adhesive pad described herein also includes a metallic coil for acting as an antenna for wireless communications to and from the on-body medical device. The novel adhesive pad may provide physiological sensing mechanisms or arrays. The novel adhesive pad may have components with the ability to process data, transmit information to other devices or act as a hub or conduit for multiple on-body devices.

The adhesive pad may include a power source secured or electrically connected to the adhesive pad for providing power. The power source may be, for example, one of a battery power source or an energy harvesting device. The adhesive pad may include an electronic component electrically coupled to the metallic coil. The electronic component may be a sensor for sensing a biometric of the user. The sensor may measure at least one of activity, heart rate, moisture, temperature, an analyte level (such as glucose level), or sound pressure. At least one additional sensor may also be electrically coupled to the metallic coil. The electronic component may be a system on a chip (SoC) or a wireless communications component. The metallic coil may serve as an inductive coil for powering the electronic component.

In accordance with an inventive aspect, a system may include an on-body medical device and an adhesive pad for use with an on-body medical device. The adhesive pad may have a geometry configured to at least partially surround the on-body medical device. The adhesive pad may have an adhesive on at least one side of the adhesive pad for securing the adhesive pad to skin of a user. The adhesive pad may include a metallic coil for acting as an antenna for wireless communications to and from the on-body medical device.

The on-body medical device may be a drug pump such as an insulin pump. The on-body medical device may include an inductive coil. The metallic coil of the adhesive pad and the inductive coil of the on-body medical device may communicate via Near Field Communication (NFC). The metallic coil and the inductive coil may be configured to create magnetic fields to induce current in each other. An electronic component may be electrically connected to the metallic coil. The adhesive pad may be secured to a skin of the user and may overlap with a portion of the on-body medical device to help secure the on-body medical device to the user.

In accordance with an inventive aspect, a method comprises including a metallic coil in an on-body medical device and including a metallic coil in an adhesive pad in proximity to the on-body medical device. The method further comprises configuring the metallic coil in the adhesive pad as an antenna for wireless communications. The method may further include securing an electronic component to the adhesive pad and electronically connecting the electronic component to the metallic coil to provide power to the electronic component. The on-body medical device may be a drug pump such as an insulin pump.

BRIEF DESCRIPTION OF THE DRAWINGS

FIG. 2B depicts illustrative alternative geometries for an adhesive pad of an exemplary embodiment.

DETAILED DESCRIPTION

Figure 1:
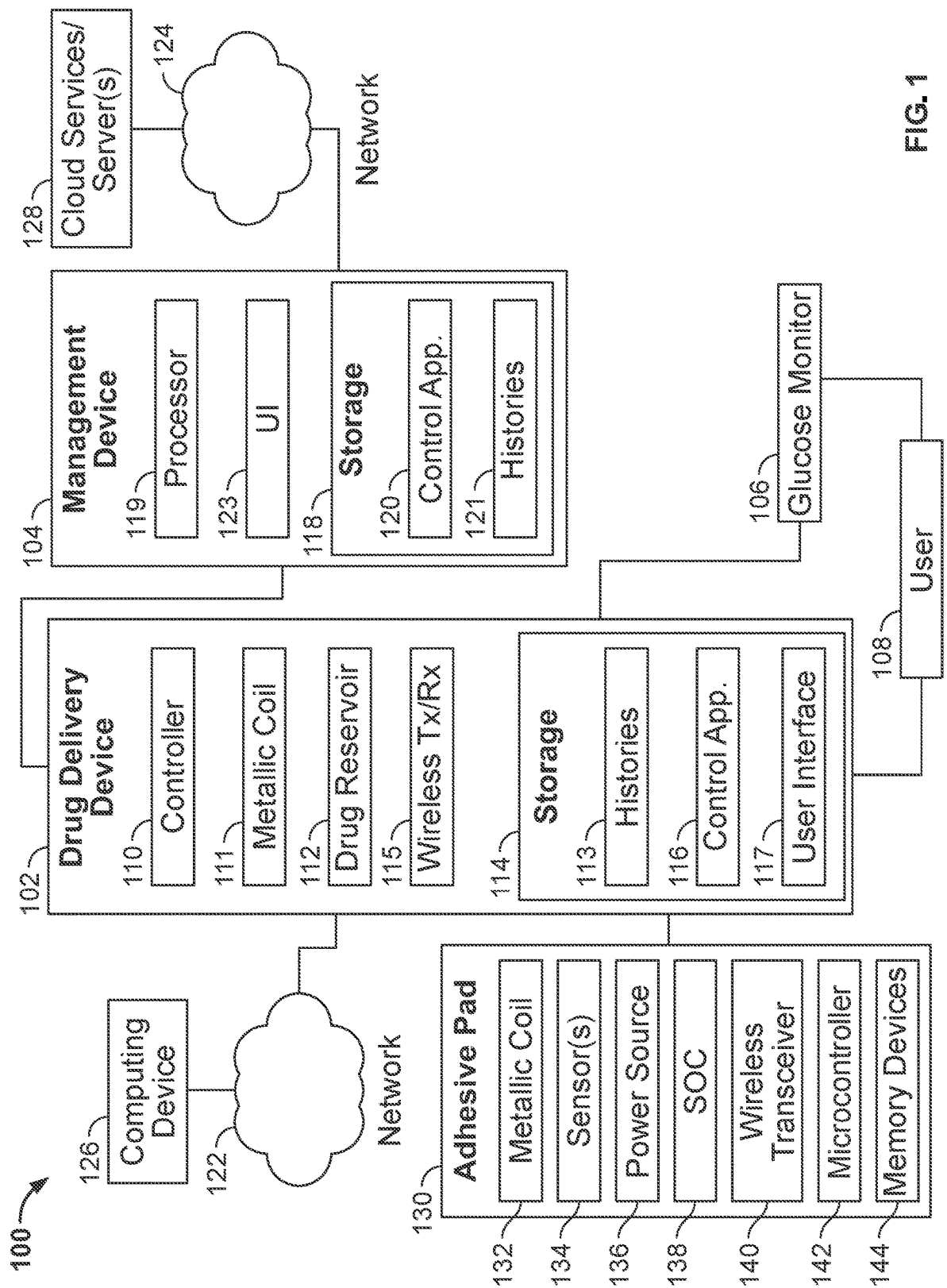
FIG. 1 depicts an illustrative drug delivery system for an exemplary embodiment that includes an on-body drug delivery device and an adhesive pad.

Exemplary embodiments may provide an adhesive pad that is designed to be used with an on-body medical device. The adhesive pad may partially or fully surround a surface of the on-body medical device. The adhesive pad may provide a primary or an additional mechanism for helping to secure the on-body medical device to the user. For example, a top surface of the adhesive pad may be secured to the on-body medical device via an adhesive or via spot welding, for example, and a bottom surface of the adhesive pad may secure the on-body medical device to the skin of a user. In another example, the on-body medical device may be secured to the user via adhesive placed on a bottom surface of the on-body medical device or by a second adhesive pad that is part of the on-body medical device. The adhesive pad may overlap with the second adhesive pad to be secured to the second adhesive pad and may include additional area that surrounds the on-body medical device that adheres to the skin of the user. The adhesive pad may provide additional surface area that adheres to the skin of the user and that is positioned over at least a portion of the second adhesive pad. As a result, the on-body medical device is held more securely to the user in this example.

In addition, the adhesive pad may include a metallic coil, such as a metal loop, that is woven into the adhesive pad or otherwise inserted into or secured to the adhesive pad. The metallic coil may play multiple roles. First, the metallic coil may act as an antenna to facilitate wireless communications with the on-body medical device, such as NFC communications. In addition, the metallic coil may serve as a power source for electric components positioned on the adhesive pad. The metallic coil may carry current produced by induction due to magnetic fields produced by a corresponding magnetic coil in the on-body medical device. Alternatively, a power source such as a battery-based power source or energy harvesting device may be positioned on the adhesive pad to provide power to the metallic coil. In some exemplary embodiments, power is provided by the on-body medical device.

Electronic components may be positioned on or within the adhesive pad and may be electrically connected to the metallic coil. The metallic coil may provide power to the electronic components. Examples of electronic components that may be positioned on or within the adhesive pad include but are not limited to sensors, a SoC or a wireless communications component for transmitting and receiving wireless communications via the metallic coil.

Thus, the adhesive pad may have the additional advantage of providing additional electronic components, like sensors or an SoC, in proximity to the on-body medical device without occupying valuable space inside the on-body medical device. These electronic components can improve the operation of the on-body medical device without using valuable surface area on the printed circuit board of the on-body medical device.

The on-body medical device may be a drug delivery device in some exemplary embodiments. FIG. 1 depicts an illustrative drug delivery system (100) that includes an on-body drug delivery device (102) as the on-body medical device and an adhesive pad (130) that is used with the on-body drug delivery device (102). The on-body drug delivery device (102) may be directly coupled to a user (e.g., directly attached to a body part and/or skin of the user (108) via an adhesive or the like). In an example, a surface of the on-body drug delivery device (102) may include an adhesive to facilitate attachment to the user (108).

The on-body drug delivery device (102) may include a controller (110). The controller (110) may be implemented in hardware, software, or any combination thereof. The controller (110) may, for example, be a microprocessor, a logic circuit, a field programmable gate array (FPGA), an application specific integrated circuit (ASIC) or a microcontroller coupled to a memory. The controller (110) may maintain a date and time as well as other functions (e.g., calculations or the like). The controller (110) may be operable to execute a control application (116) stored in the storage (114) that enables the controller (110) to direct operation of the on-body drug delivery device (102). The storage (114) may hold histories (113) for a user. Where the on-body drug delivery device (102) is an insulin delivery device, the histories (113) may include information such as a history of automated insulin deliveries, a history of bolus insulin deliveries, meal event history, exercise event history, and the like. In addition, the controller (110) may be operable to receive data or information. The storage (114) may include both primary memory and secondary memory. The storage (114) may include random access memory (RAM), read only memory (ROM), optical storage, magnetic storage, removable storage media, solid state storage or the like.

The on-body drug delivery device (102) may include a drug reservoir (112) for storing a drug, such as insulin, for delivery to the user (108) as warranted. A fluid path to the user (108) may be provided, and the on-body drug delivery device (102) may expel the drug from the drug reservoir (112) to deliver the drug to the user (108) via the fluid path. The fluid path may, for example, include tubing coupling the on-body drug delivery device (102) to the user (108) (e.g., tubing coupling a cannula to the drug reservoir (112)).

There may be one or more communications links with one or more devices physically separated from the on-body drug delivery device (102) including, for example, a management device (104) of the user and/or a caregiver of the user, a glucose monitor (106) and/or an adhesive pad (130). The drug delivery device (102) may include a metallic coil (111) that acts as an antenna. In addition, a wireless transceiver (115) may be provided to transmit and receive wireless communications. The communication links may include any wired or wireless communication link operating according to any known communications protocol or standard, such as the Bluetooth® standard, the Bluetooth® Low Energy (BLE) standard, Wi-Fi (IEEE 802.11), the NFC standard, a cellular standard, the Wireless Body Area Network Standard (see IEEE 802.15.06) or any other wireless protocol or standard. The on-body drug delivery device (102) may also include a user interface (117), such as an integrated display device for displaying information to the user (108) and in some embodiments, receiving information from the user (108). The user interface (117) may include a touchscreen and/or one or more input devices, such as buttons, knob or a keyboard.

The on-body drug delivery device (102) may interface with a network (122). The network (122) may include a local area network (LAN), a wide area network (WAN) or a combination therein. A computing device (126) may be interfaced with the network, and the computing device may communicate with the on-body drug delivery device (102).

The drug delivery system (100) may include a glucose monitor (106) for sensing the blood glucose concentration levels of the user (108). The glucose monitor (106) may provide periodic blood glucose concentration measurements and may be a continuous glucose monitor (CGM), or another type of device or sensor that provides blood glucose measurements. The glucose monitor (106) may be physically separate from the on-body drug delivery device (102) or may be an integrated component thereof. The glucose monitor (106) may provide the controller (110) with data indicative of measured or detected blood glucose levels of the user (108). The glucose monitor (106) may be coupled to the user (108) by, for example, adhesive or the like and may provide information or data on one or more medical conditions and/or physical attributes of the user (108). The information or data provided by the glucose monitor (106) may be used to adjust drug delivery operations of the on-body drug delivery device (102).

The drug delivery system (100) may also include management device (104). The management device (104) may be a special purpose device, such as a dedicated personal diabetes manager (PDM) device. Alternatively, the management device (104) may be a programmed general-purpose device, such as any portable electronic device including, for example, a dedicated controller, such as processor, a smartphone, or a tablet. The management device (104) may be used to activate or program or adjust operation of the on-body drug delivery device (102) and/or the glucose monitor (106). The management device (104) may be any portable electronic device including, for example, a dedicated controller, a smartphone, or a tablet. In the depicted example, the management device (104) may include a processor (119) and a storage (118). The processor (119) may execute processes to manage a user's blood glucose levels and for controlling the delivery of the drug or therapeutic agent to the user (108). The processor (119) may also be operable to execute programming code stored in the storage (118). For example, the storage may be operable to store one or more control applications (120) for execution by the processor (119). The storage (118) may store the control application (120), histories (121) like those described above for the insulin delivery device (102) and other data and/or programs. In another example, after activation, the on-body drug delivery device (102) may operate without the management device (104) by communicating with the glucose monitor (106) and delivering a drug based on those communications using an automated drug delivery (ADD) application or control application (116) stored in memory on the on-body drug delivery device (102).

The management device (104) may include a user interface (123) for communicating with the user (108). The user interface may include a display, such as a touchscreen, for displaying information. The touchscreen may also be used to receive input when it is a touch screen. The user interface (123) may also include input elements, such as a keyboard, button, knobs or the like.

The management device 104 may interface with a network (124), such as a LAN or WAN or combination of such networks. The management device (104) may communicate over network (124) with one or more servers or cloud services (128).

An adhesive pad (130) may be provided in the drug delivery system (100). As was mentioned above, the adhesive pad (130) secures or helps to further secure the on-body drug delivery device to the user (108). In addition, the adhesive pad (130) may contain additional electronic components so that those components need not be incorporated inside the on-body drug delivery device (102), in which space is at a premium. The adhesive pad (130) may include a metallic coil (132), such as a metal loop or a rectangular metal coil, such as found with NFC antennas. The metallic coil (132) may act as an antenna for wireless communications, a conduit for delivering power to electronic components and/or an inductive power source, as will be explained in more detail below.

The adhesive pad (130) may include electronic component(s) that are secured to the adhesive pad (130), such as by being woven into the pad, inserted to or within the pad, or stuck to the pad by adhesive. A first example of such electronic components that are secured to the adhesive pad (130) are sensors (134) for sensing biometric information of the user (108). The electronic components secured to the adhesive pad (130) may also include a power source (136), such as a battery-based power source or an energy harvesting device. The electronic components secured to the adhesive pad (130) may include a System on a Chip (SoC) (138) that may provide computing capability or other functionality.

The electronic components secured to the adhesive pad (130) may include a wireless transceiver or other wireless communications chip (140) enabling wireless communications via the metallic coil (132). For example, the wireless transceiver or other wireless communications chip (140) may enable wireless communications via the NFC standard, the Bluetooth® standard, the Bluetooth® Low Energy (BLE) standard, Wi-Fi (IEEE 802.11), a cellular standard or the Wireless Body Area Network Standard (see IEEE 802.15.06). The adhesive pad (130) may include a microcontroller (142) for processing data and performing operations. Still further, the adhesive pad (130) may include one or more memory devices (144) for storing data and/or instructions. Given the wireless transceiver (140), the microcontroller (142) and the one or more memory devices (144), the adhesive pad (130) may act as a hub or conduit among other on-body medical devices and the drug delivery system (100).

Figure 2A:
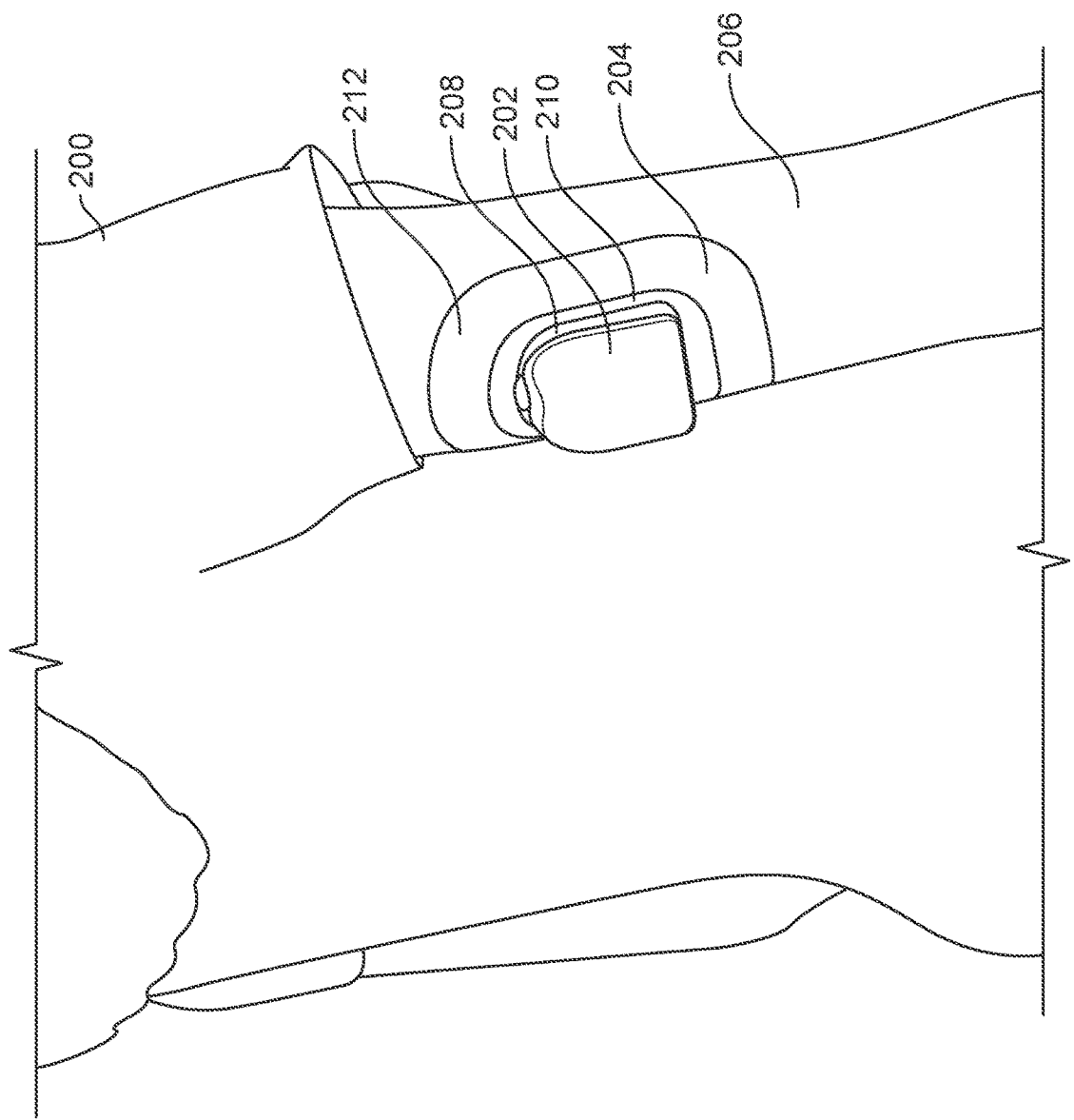
FIG. 2A depicts an illustrative user wearing an on-body drug delivery device and adhesive pad of an exemplary embodiment.

FIG. 2A shows an example of a user (200) wearing an on-body drug delivery device (202) with the adhesive pad (204) fully surrounding the on-body drug delivery device (202). Both the on-body drug delivery device (202) and the adhesive pad (204) are secured to the back of the arm (206) of the user (200). The on-body drug delivery device (202) and the adhesive pad (204) may be secured to other areas of the user (200), such as, for example, the user's abdomen, lower back or leg. In the example shown in FIG. 2A, the on-body drug delivery device (202) includes an adhesive pad (208) secured to a bottom surface of the on-body drug delivery device (202) and to the skin of the user (200) via the adhesive on the adhesive pad (208). The adhesive pad (204) overlaps with the adhesive pad (208) of the on-body drug delivery device (202) in an annular region 210 in the example shown in FIG. 2A. The adhesive on the adhesive pad (204) adheres to the top surface of the adhesive pad (208) of the on-body drug delivery device (202). The non-overlapping region (212) of the adhesive pad (204) adheres to the skin of the patient. As a result, the adhesive pad (204) more greatly secures the on-body drug delivery device (202) to the user (200) versus the conventional use of only the adhesive pad (208) of the on-body medical device (202) to secure the on-body drug delivery device (202) to the user (200).

In an alternative embodiment, the adhesive pad (208) and adhesive pad (204) may be integral, or in other words, one adhesive pad (130) that both (1) houses (or secures therein) additional electronic components not located within the on-body medical device, and (2) secures the on-body medical device to the skin of the user. The additional electronic components may be located in annular region (210), and/or may be located directly under the on-body medical device (102/202), and/or may be located outside of annular region (210).

It will be appreciated that the adhesive pad (204) may assume different geometries than those shown in FIG. 2A. In some geometries, the adhesive pad (204) only partially surrounds the on-body drug delivery device. FIG. 2B shows an example of some alternative geometries for the adhesive pad (204). For instance, in the geometry (220), there are four disjoint segments, including two curved segments (222) and (224) and two straight sections (226) and (228) for positioning around the on-body drug delivery device (202) to partially enclose (in at least one plane) the on-body drug delivery device (202). In some exemplary embodiments, only the straight sections (226) and (228) are used to secure the on-body drug delivery device (202). In other exemplary embodiments, only the curved sections (222) and (224) are used to secure the on-body drug delivery device (202). In geometry (230), the adhesive pad is horseshoe shaped with an opening (232). In geometry (240), the adhesive pad has a geometry akin to that shown in FIG. 2A where the adhesive pad (204) fully surrounds the on-body drug delivery device (202), but the adhesive pad has a rectangular shape rather than an oval shape. It will be appreciated that the geometries of FIGS. 2A and 2B are intended to be illustrative and not exhaustive or limiting.

Figure 3:
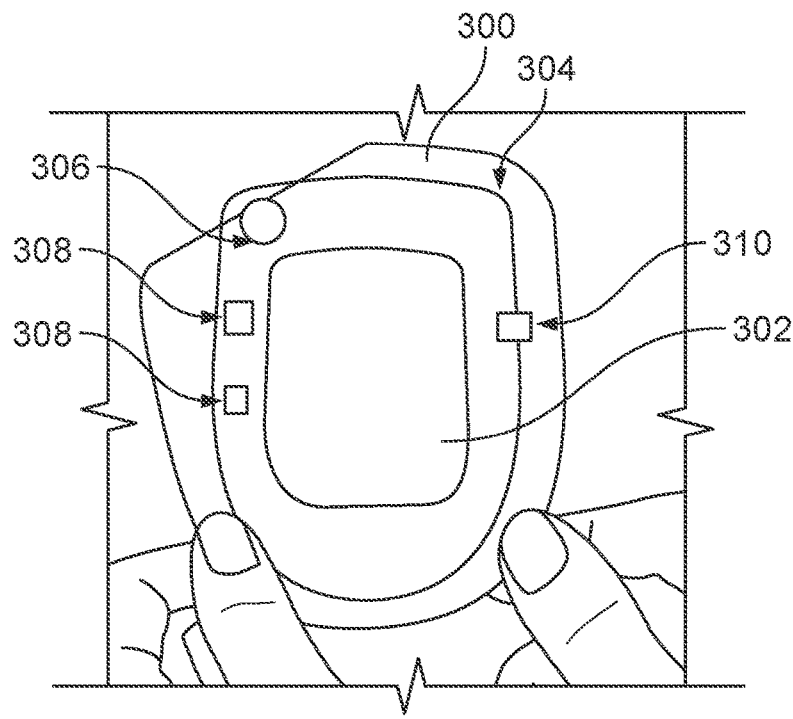
FIG. 3 depicts an illustrative arrangement of components secured to an adhesive pad of an exemplary embodiment.

FIG. 3 shows an example of an adhesive pad (300) with a metallic coil (304) embedded or otherwise secured to the adhesive pad (300). As was mentioned above, the metallic coil (304) may be woven, adhered or otherwise secured to the adhesive pad (300). In the example of FIG. 3, the metallic coil (304) has a shape like that of the outline of the on-body drug delivery device (202) (FIG. 2A) from a plan view. In this example, the metallic coil (304) is a simple loop but may assume other forms such as a rectangular arrangement, an arrangement with concentric loops of metal, a zig-zag pattern arrangement or other forms.

The adhesive pad (300) may include a number of electronic components that are electrically connected to the metallic coil (304). For example, a power source (306) may be secured to the adhesive pad (300) and electrically connected to the metallic coil (304). Electronic components like sensors (308) may also be secured to the adhesive pad (300) via, for example, weaving, insertion or adhesive and electrically connected to the metallic coil (304). An additional electronic component (310) may be secured to the adhesive pad (300) and electrically connected to the metallic coil (304). The additional electronic component (310) may be, for example, an SoC that provides computing power or another functionality. Moreover, the additional electronic component (310) may be a wireless communications chip for facilitating wireless communications with the on-body drug delivery device, such as a wireless transceiver and/or related components. The adhesive pad (300) may include multiple layers of material, and the electronic components (306), (308) and (310), in some embodiments, may be positioned between the layers of material. The adhesive pad (300) may include an opening (302) for accommodating the on-body drug delivery device. Alternatively, this region (302) may be where the adhesive pad (300) is secured to the on-body drug delivery device by, for example, spot welding.

Figure 4:
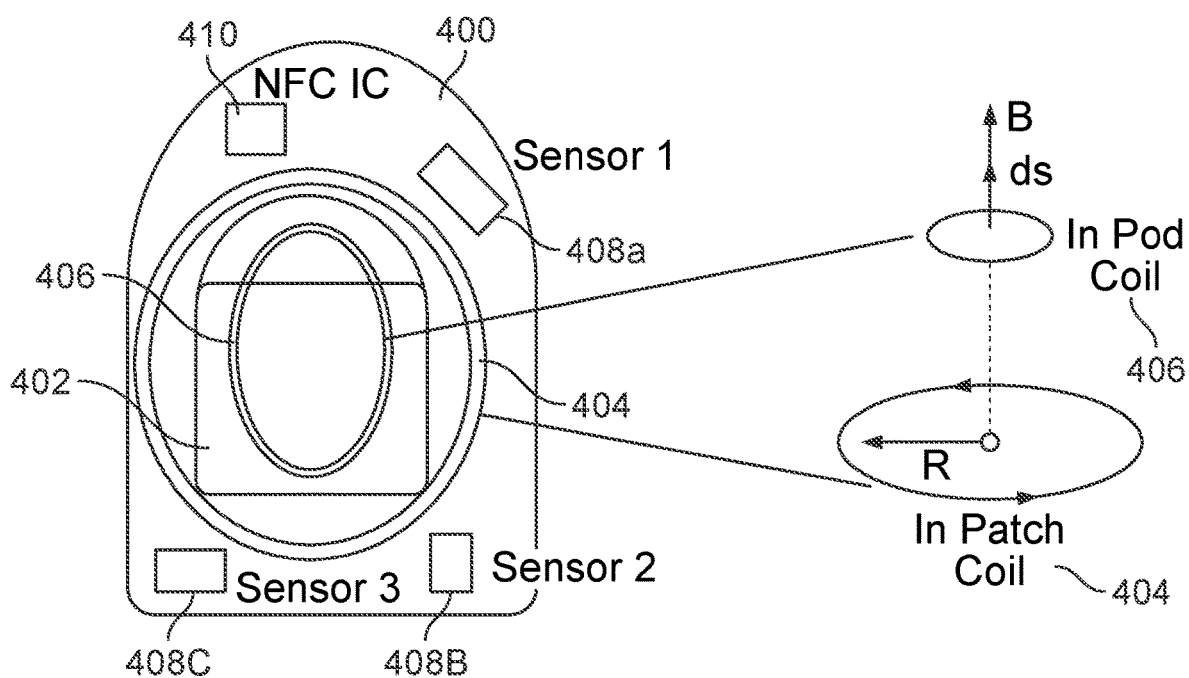
FIG. 4 depicts an adhesive pad and an on-body drug delivery device positioned relative to each other when worn by a user in accordance with an exemplary embodiment.

FIG. 4 depicts the adhesive pad (400) and the on-body drug delivery device (402) positioned together as when adhered to a user. In the example of FIG. 4, the adhesive pad (400) has a metallic coil ("in-patch coil") (404) secured or positioned within the adhesive pad (400) and sensors (408A, 408B and 408C) secured to or placed within the adhesive pad (400). An integrated circuit (IC) for facilitating NFC communications (410) also is secured to the adhesive pad (400). The on-body drug delivery device (402) also includes a metallic coil ("in-pad coil") (406) positioned within or on top of the on-body drug delivery device (402). Applying power to one of the metallic coils (404) and (406) causes magnetic fields to be generated. The magnetic fields cause a current to be produced in the other of the metallic coils (404) and (406). The magnetic coils (404) and (406) act as antennas for transmitting and receiving wireless signals, such as NFC signals. The NFC IC (410) may receive from the metallic coil (404) acting as an antenna and may generate and transmit signals with the metallic coil (404) acting as an antenna. The wireless signals may, for example, be sent to the on-body drug delivery device (402) or received from the on-body drug delivery device (402).

Figure 5:
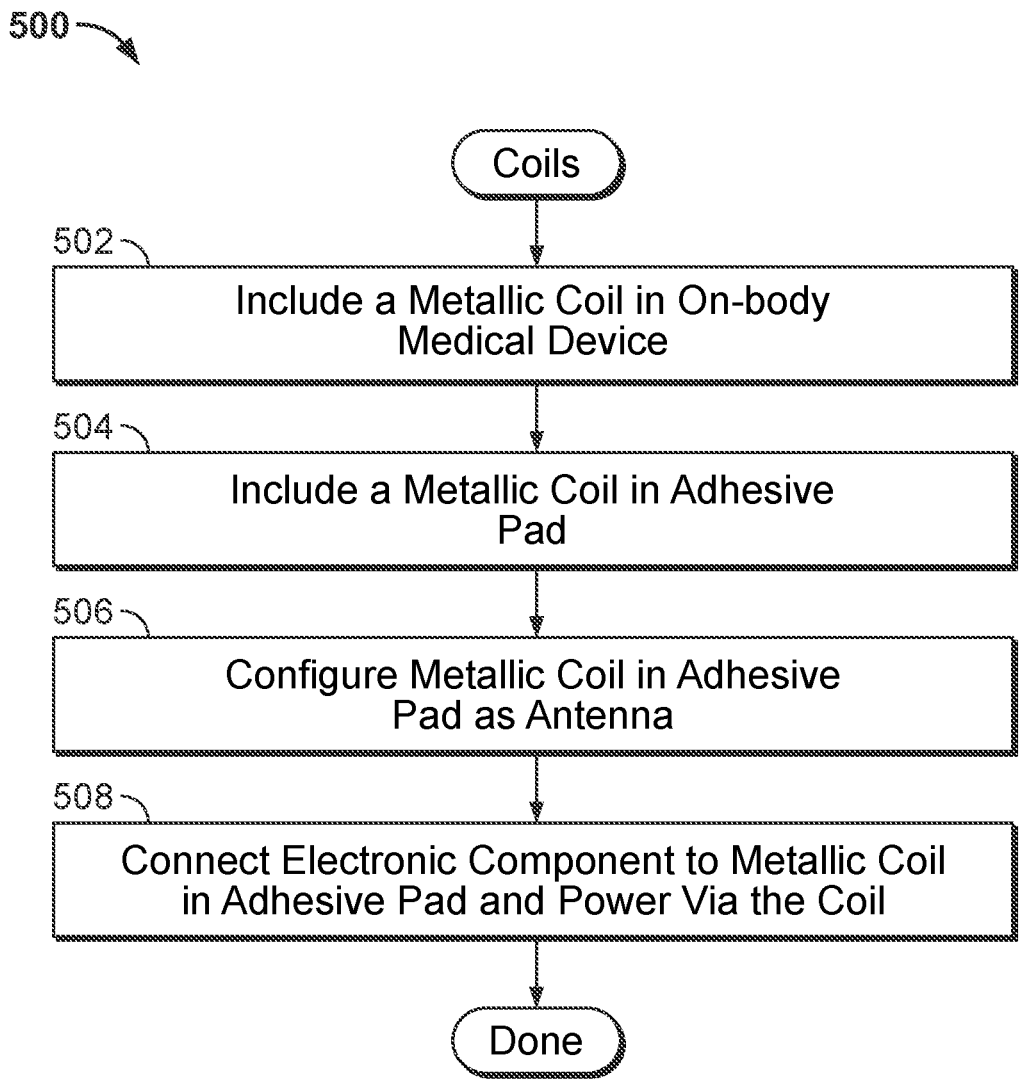
FIG. 5 depicts a flowchart of illustrative steps that may be performed to use metallic coils of the on-body drug delivery device and adhesive pad in an exemplary embodiment.

FIG. 5 depicts a flowchart 500 of steps that may be performed in an exemplary embodiment to use the metallic coils, like (404) and (406). First, a metallic coil (406) is included in the on-body drug delivery device (502). A metallic coil (404) also is included in the adhesive pad (400) (504). The metallic coil (404) in the adhesive pad (400) is configured to act as an antenna (506). This may entail connecting a wireless communication IC like NFC IC (410) in FIG. 4 to the metallic coil (404). An electronic component (like (408A), (408B) or (408C)) is connected to the metallic coil (404) on the adhesive pad (400). The metallic coil (404) provides power to the connected electronic component(s) (508). Thus, the metallic coil (404) is not only used as an antenna for wireless communications but also as a power conduit for delivering power to the connected electronic components.

Figure 6A:
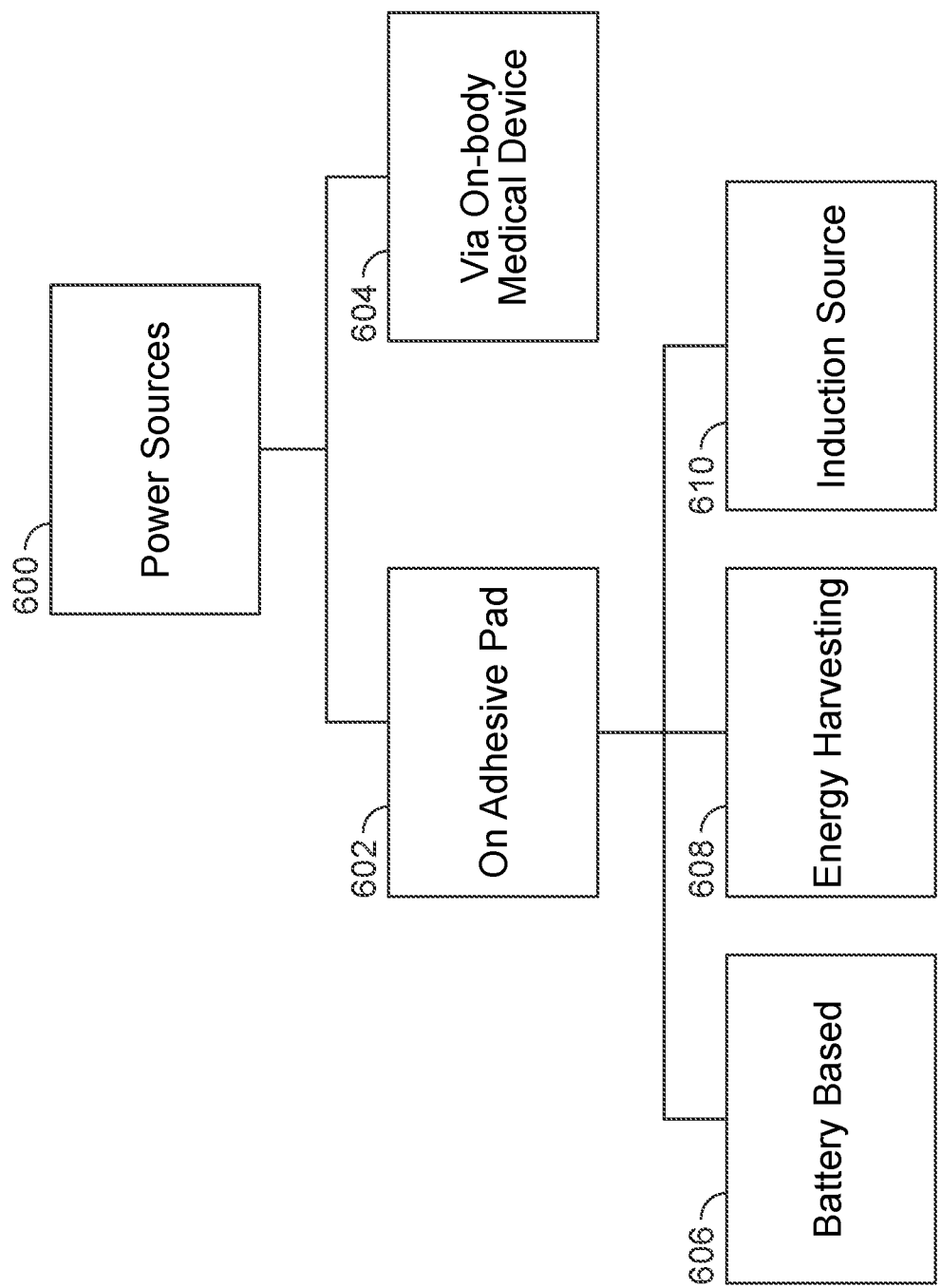
FIG. 6A depicts a diagram of different types of power sources that may be used with an adhesive pad in an exemplary embodiment.

As was discussed above, a power source may be provided on the adhesive pad (400). FIG. 6A depicts a number of different types of power sources (600) that may be used. The power sources may be resident on the adhesive pad (602) or may be provided via the on-body drug delivery device (604). This may entail a wired connection to the power source of the on-body drug delivery device (402), such as a wired connection between the adhesive pad of the on-body drug delivery device (402) and the adhesive pad (400). When the power source is resident on the adhesive pad (400) (602), the power source may be battery-based (606), such as one or more batteries, like low profile button cell batteries. Alternatively, the power source may be an energy harvesting device (608). Examples of energy harvesting devices (608) include solar devices, motion driven energy harvesting devices, thermal energy harvesting devices and the like. Lastly, the energy source may be an induction source (610), such as induction in the metallic coil (404) brought about by magnetic fields from the metallic coil (406) of the drug delivery device (402) when power is applied to the magnetic coil (406).

As has been discussed above, sensors (620) (FIG. 6B) may be secured to the adhesive pad (400). These sensors (620) may take many different forms. A sensor may be an activity sensor (622), like an accelerometer, which measures movement. A sensor may be a sensor of a blood glucose level (624) of the user. A sensor may measure the heart rate (626) of the user. A sensor may measure the moisture level (628), such as on a user's skin, to tell if the user is sweating or not. A sensor may measure sound pressure (630). A sensor may measure the temperature (632) of the user. All these biometric values measured by the sensor(s) (620) may be useful in gauging a current state of the user and may be used by the controller 110 (FIG. 1) in controlling drug delivery to the user.

Figure 6B:
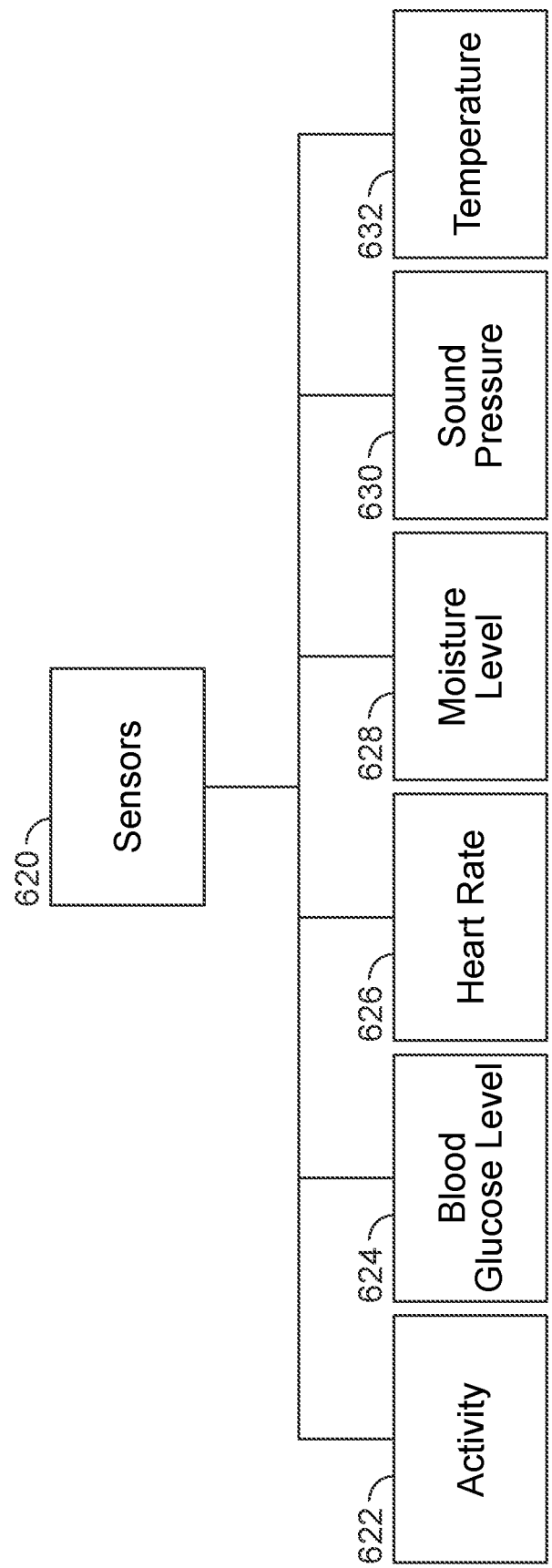
FIG. 6B depicts a diagram of different types of sensors that may be secured to the adhesive pad in accordance with an exemplary embodiment.
Figure 7:
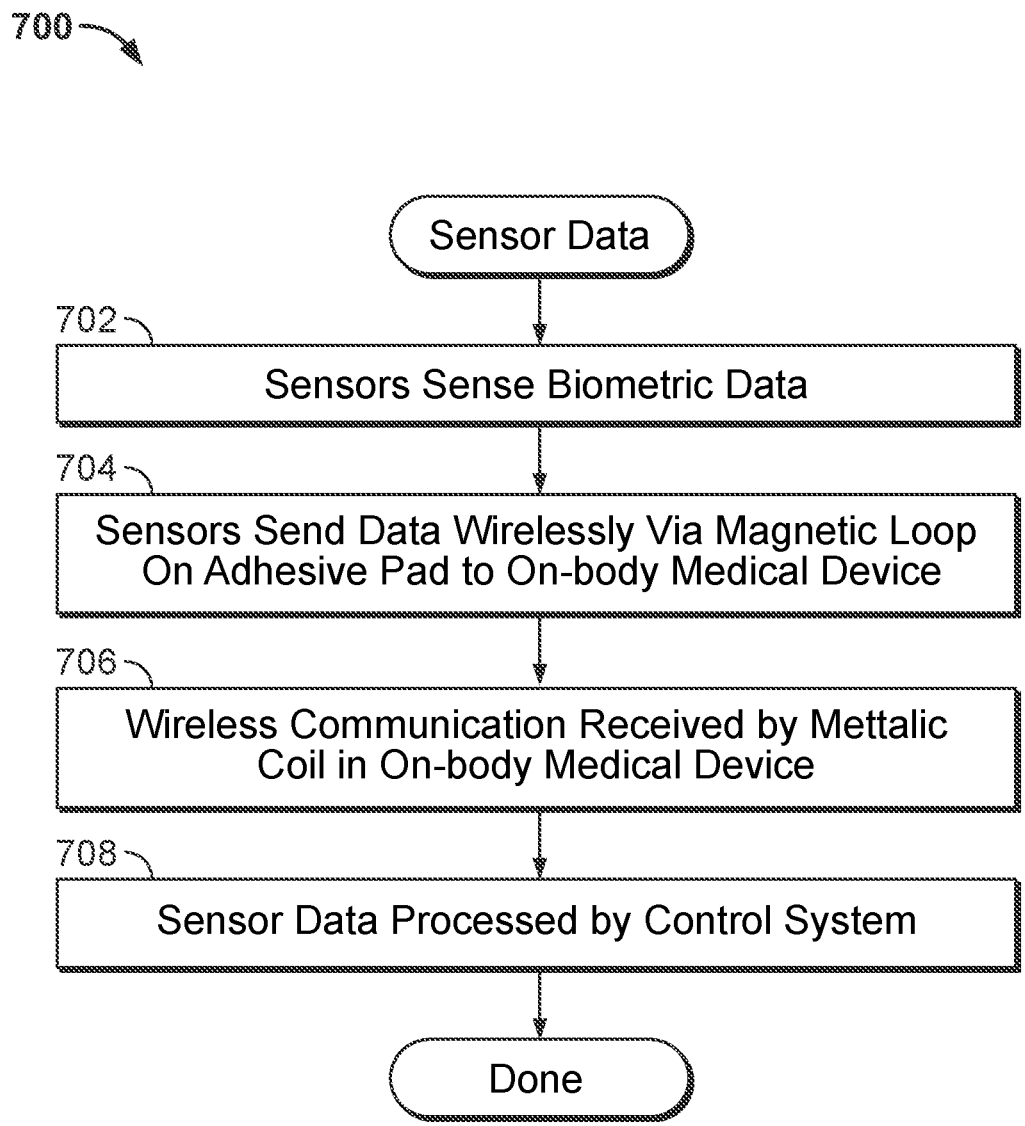
FIG. 7 depicts a flowchart showing illustrative steps that may be performed in an exemplary embodiment to use data from sensors.

FIG. 7 depicts a flowchart (700) of steps that may be performed in exemplary embodiments with respect to data gathered by sensors, like those types depicted in FIG. 6B. Initially, the sensors sense biometric data (702). For instance, a first sensor may sense the heart rate of the user, and a second sensor may sense the temperature of the user. The sensors send the data wirelessly via the metallic coil (404) on the adhesive pad (400) to the metallic coil (406) of the on-body drug delivery device (402) (704). This may be done at periodic sampling times or when requested. The metallic coil (406) in the on-body drug delivery device (402) receives the sensor data (706). The received sensor data is passed on to the controller (110) and processed in accordance with the control application (116) run on the controller (110) (708). In this fashion, the sensor data acts as input to the control algorithm that may drive decisions regarding drug delivery to the user.

Figure 8A:
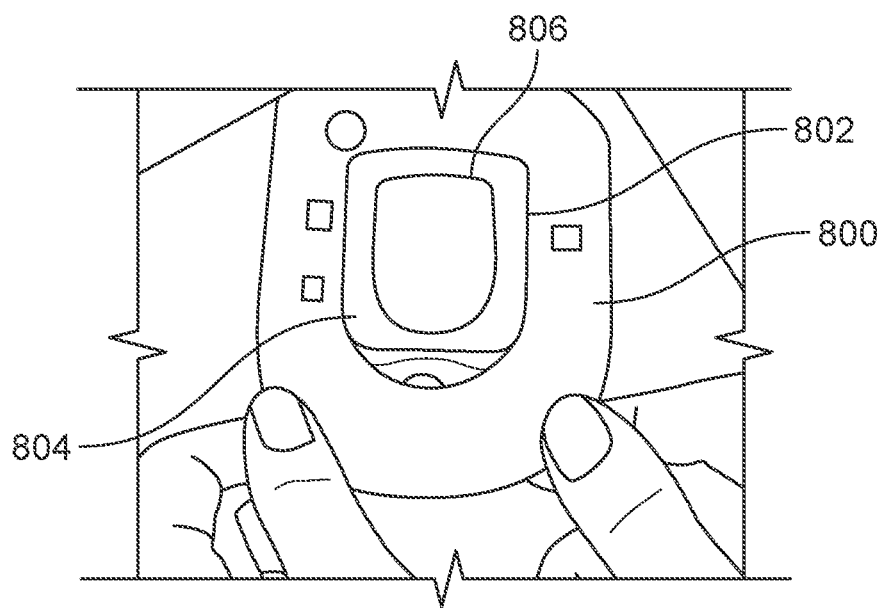
FIG. 8A depicts an arrangement in which a metallic coil of an adhesive pad couples with a metallic coil of an on-body drug delivery device via a bottom cover of the on-body drug delivery device in an exemplary embodiment.
Figure 8B:
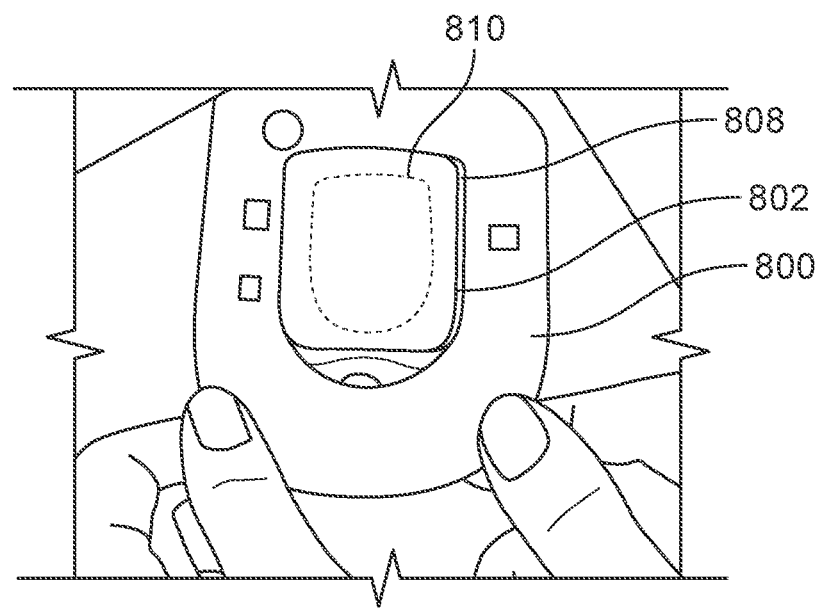
FIG. 8B depicts an arrangement in which a metallic coil of an adhesive pad couples with a metallic coil of an on-body drug delivery device via a top cover of the on-body drug delivery device in an exemplary embodiment.

The metallic coil (404) adhesive pad (400) may engage the metallic coil of the drug delivery device (402) in different ways. FIG. 8A depicts a first way of engagement. In the approach of FIG. 8A, the adhesive pad (800) is secured over the drug delivery device (802). The metallic coil (806) is positioned near or on the top cover of the drug delivery device to couple with the metallic coil (404) within or below the adhesive pad (400) (FIG. 4). The adhesive pad (800) adheres in part to the top portion of the drug delivery device (802). Alternatively, as shown in FIG. 8B, the metallic coil (404) of the adhesive pad (800) may couple with the metallic coil (810) in the drug delivery device (802) via the bottom cover (808) of the drug delivery device (802). The metallic coil (810) may be positioned near or on the bottom cover (808).

Figure 9A:
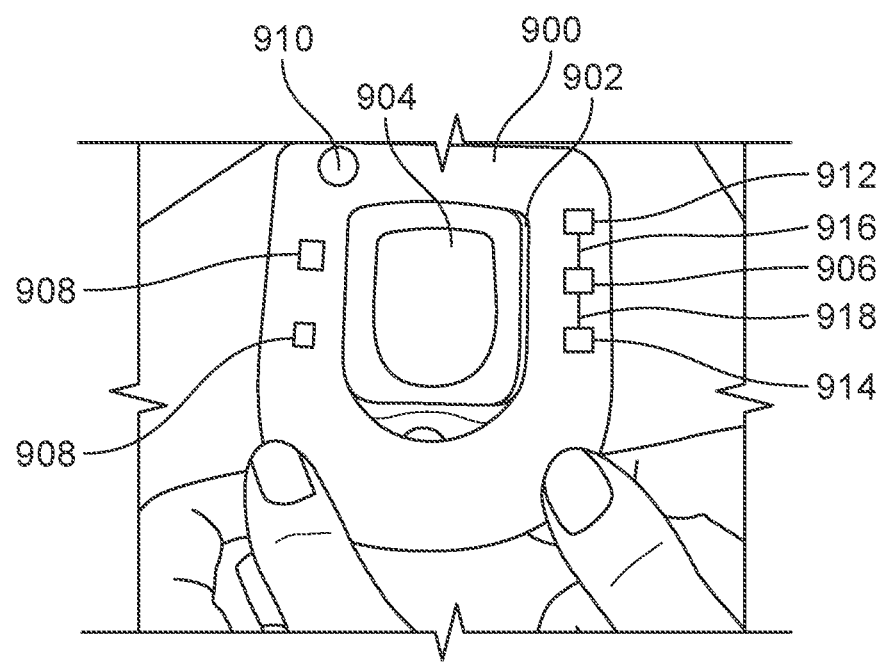
FIG. 9A depicts an illustrative arrangement where electronic components of the on-body drug delivery device are electrically connected via wires to an electronic component secured to the adhesive pad in an exemplary embodiment.
Figure 9B:
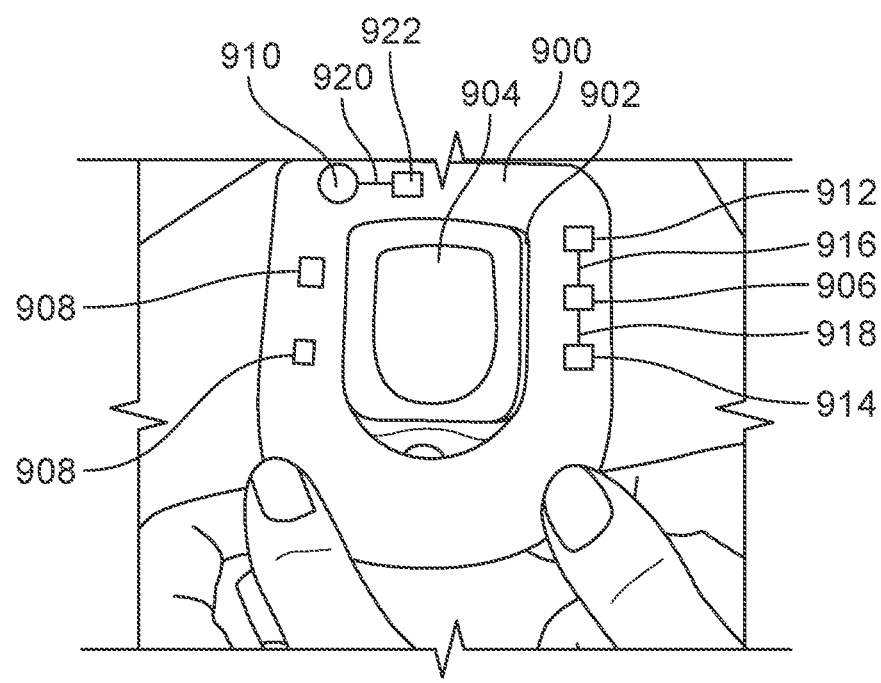
FIG. 9B depicts an illustrative arrangement where electronic components of the on-body drug delivery device are electrically connected via wires to an electronic component secured to the adhesive pad and a power source secured to the adhesive pad is electrically connected to an electronic component of the on-body drug delivery device via a wire in an exemplary embodiment.

There may be wired connections between the drug delivery device (402) and the adhesive pad (400). In FIG. 9A, the adhesive pad (900) is positioned under the bottom cover (904) of the drug delivery device (902). The adhesive pad of the drug delivery device (902) is not visible but overlaps in an annular region like (210) in FIG. 2A. The adhesive pad may include a power source (910) and electronic components (906) and (908) that are secured to the adhesive pad (900). Alternatively, the electronic components (906) may be powered by the power source within the on-body drug delivery device. The adhesive pad of the drug delivery device (902) includes electronic components (912) and (914). In some exemplary embodiments, the electronic components (912) and (914) have respective electrical connections (916) and (918) with electronic component (906). The electrical connections (916) and (918) may be realized as conductive wires that extend between the adhesive pad (900) and the adhesive pad of the drug delivery device (902). The connections are not limited to between electronic components as shown in FIG. 9A. There also may be an electrical connection (920) between the power source (910) and an electronic component (922) on the adhesive pad of the drug delivery device (902) as shown if FIG. 9B. In such an arrangement, the power source (910) provides power to the electronic component (922) via the electrical connection (920). The depiction in FIG. 9B otherwise is like that of FIG. 9A.

While exemplary embodiments have been described herein, various changes in form and detail may be made relative to the exemplary embodiments that fall within the intended scope as defined in the appended claims.

The invention claimed is:

1. A system, comprising:
an on-body medical device having a first metallic coil; and
an adhesive pad for use with an on-body medical device, comprising:
a geometry configured to at least partially surround the on-body medical device,
an adhesive on one side of the adhesive pad for securing the adhesive pad to skin of a user, and
a second metallic coil secured to or positioned within the adhesive pad for acting as an antenna for wireless communications to and from the on-body medical device, wherein the first metallic coil and the second metallic coil are positioned and configured so that applying power to either of the metallic coils causes a magnetic field to be generated that causes a current to be generated in the other of the metallic coils to facilitate the wireless communications; and
an electronic component secured to the adhesive pad and electrically connected to the second metallic coil so that the second first metallic coil powers the electronic component.

2. The system of claim 1, wherein the electronic component is a sensor for sensing a biometric of the user.

3. The system of claim 2, further comprising at least one additional sensor electrically coupled to the second metallic coil.

4. The system of claim 2, wherein the sensor measures at least one of activity, heart rate, moisture, temperature, glucose, analytes or sound pressure.

5. The system of claim 1, wherein the electronic component is a system on a chip (SoC).

6. The system of claim 1, wherein the electronic component is a wireless communications component.

7. The system of claim 1, wherein the on-body medical device is an insulin pump.

8. The system of claim 1, wherein the second metallic coil of the adhesive pad and the first metallic coil of the on-body medical device communicate via Near Field Communication (NFC).

9. The system of claim 1, wherein the adhesive pad is configured to be secured to a skin of the user and overlap with a portion of the on-body medical device to help secure the on-body medical device to the user.

10. A method, comprising:
including a first metallic coil in an on-body medical device;
including a second metallic coil in an adhesive pad in proximity to the on-body medical device;
securing an electronic component to the adhesive pad;
configuring the second metallic coil in the adhesive pad as an antenna for wireless communications to and from the on-body medical device, wherein the first metallic coil and the second metallic coil are positioned and configured so that applying power to either of the metallic coils causes a magnetic field to be generated that causes a current to be generated in the other of the metallic coils to facilitate the wireless communications; and
electronically connecting the electronic component to the second metallic coil to provide power to the electronic component.

11. The method of claim 10, wherein the on-body medical device is an insulin pump.

* * * * *